United States Patent Office 2,704,752
Patented Mar. 22, 1955

2,704,752

ACCELERATED VULCANIZATION OF RUBBER

Roger A. Mathes and Floyd D. Stewart, Akron, Ohio, assignors to The B. F. Goodrich Company, New York, N. Y., a corporation of New York No Drawing. Application January 27, 1954, Serial No. 406,611

10 Claims. (Cl. 260—79.5)

This invention relates to vulcanization of rubber and rubber compositions and more particularly relates to vulcanization of rubber and rubber compositions in the presence of accelerators and accelerator activators.

For many years it has been customary in the compounding of rubber and rubber compositions to include a material of the class known as accelerators, which speeds the process of vulcanization. Another widely used class of compounds is that known as accelerator activators. The purpose of these latter compounds is to enhance the activity of the accelerator so as to speed up the vulcanization without adversely affecting (i. e. shortening) the scorch characteristics of the accelerator. Shortening of the vulcanization time is highly desirable, for the faster the vulcanization can be accomplished, the more production can be processed through the molds, presses and other devices used in rubber vulcanization. Another reason for using accelerator activators is economy. Activators are generally cheaper than accelerators, yet they increase the intensity of the action of the accelerator so that when a portion of expensive accelerator is replaced with cheaper activator, the reduced amount of accelerator exerts the same or greater influence on the stocks as did the larger amount formerly used. It is with this class of compounds, namely accelerator activators, that this invention is particularly concerned.

It is an object of this invention to provide a new and effective class of accelerator activators. A further object is to produce rubber compositions having high tensile strength and relatively low elongation. Other objects will be apparent from the discussion which follows.

We have found that non-aryl primary and secondary amine salts of thiocyanic acid are desirable agents as activators for accelerators of rubber vulcanization. Such compounds are readily prepared by the reaction of the amine with ammonium thiocyanate. Aryl amines such as aniline, however, cannot be used since they form monosubstituted thioureas rather than amine salts. These reactions are illustrated by the following equations where R is an aliphatic, alicyclic or aralkyl radical and Ar is an aryl radical:

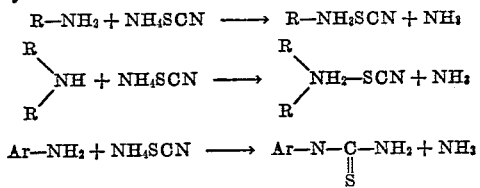

Evidence of formation of the thiocyanate salt in the first two cases is given by positive tests for thiocyanate ion with silver nitrate and ferric chloride and liberation of amine when the product is heated in the presence of sodium hydroxide. Melting points are also lower than those of the corresponding mono-substituted thioureas.

The amine salts of thiocyanic acid useful in this invention are the salts in which thiocyanic acid is combined with an amine which is a member of the class consisting of aliphatic, alicyclic and aralkyl primary and secondary amines and heterocyclic amines characterized by the fact that they contain a hydrogen atom attached to the hetero-amino nitrogen atom.

More than one primary or secondary amino group may be present as in the alkylene di- and polyamines. Preferably the amine is one which contains carbon, hydrogen and amino nitrogen atoms only, or which contains, in addition to these atoms, no atoms other than oxy oxygen atoms, that is, oxygen atoms present in hydroxyl or ether groups.

The amines which can be employed according to this invention include such mono- and di-alkyl amines as methylamine, dimethylamine, ethylamine, diethylamine, isopropylamine, diisopropylamine, ethanolamine, diethanolamine, n-butylamine, isobutylamine, di-n-butylamine, diisobutylamine, tertiary butylamine, n-amylamine, n-hexylamine, di-n-octylamine, n-dodecylamine and the like; such alicyclic amines as cyclopentylamine, cyclohexylamine, dicyclohexylamine and the like; heterocyclic amines containing the grouping:

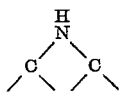

in a ring structure such as piperidine, piperazine, pipecolines, morpholine and the like; and such alkylene di- and polyamines as ethylene diamine, diethylene triamine, 1,2-propylene diamine, 1,3-propylene diamine, 1,8-octamethylene diamine, triethylene tetramine, heptaethylene octamine and the like, as well as various other amines which are not chemically saturated as are those previously named, but which are aliphatic in nature including such aliphatic unsaturated amines as allyl and diallyl amines and such aralkyl amines as benzylamine and dibenzylamine.

The activators of this invention can be used with various kinds of accelerators, but they work best with sufur-nitrogen accelerators and especially with thiazole type accelerators such as 2-mercaptothiazole, 2-mercapto-4,5-dimethyl thiazole, 2-mercapto-4-ethyl thiazole, 2-mercapto-4-phenyl thiazole, 2-mercapto-4-methyl-5-carbethoxy thiazole, 2-mercaptotetrahydro thiazole, 2-mercaptobenzothiazole, lead and zinc salts of 2-mercaptobenzothiazole, 2-mercapto-4,5-dimethylbenzothiazole, 2-mercapto-4-methyl-6-chlorobenzothiazole, 2-mercapto-6-nitrobenzothiazole, 2-mercapto-5-chlorobenzothiazole, 2,2'-dithiobis(benzothiazole), 1,3-bis(2-benzothiazolylmercaptomethyl)urea, N-cyclohexyl-2-benzothiazole sulfenamide, N-diethyl-2-benzothiazole sulfenamide, N-pentamethylene-2-benzothiazole sulfenamide, 2-(4,5-dimethylthiazole)N-diamyl sulfenamide, benzothiazyl-2-monocyclohexyl sulfenamide, 2-(2,4-dinitrophenylmercapto)benzothiazole, 2-benzothiazolyl-N,N-diethylthiocarbamyl sulfide, 2-benzyl thiazolinyl-2-sulfide, o-tolylaminomethyl thiazolinyl-2-sulfide and others.

As mentioned above, amine salts of thiocyanic acid of the type employed in the practice of the present invention are readily prepared in excellent yield by reacting ammonium thiocyanate with a primary or secondary amine other than an aryl amine. This reaction is described in U. S. Patent 2,547,722 and is best effected by first heating the reaction mixture, then subjecting it to a reduced pressure to remove the volatile ammonia byproduct. The desired compound settles to the bottom of the reactor as an oil, as in the case of n-butylamine thiocyanate, or as a crystalline material, as in the case of isopropyl amine thiocyanate. The purity of crystalline products can be increased by recrystallization of the crudes from appropriate solvents.

Only small amounts of these amine salts of thiocyanic acid are needed in the compounding recipe to serve as activator accelerators. Based on 100 parts by weight of rubber, from .05 to 2.0 parts of the salts of this invention will activate the normal rubber accelerator, with 0.1 to 1.0 part of activator being preferred for reasons of economy and general performance.

Batches of rubbery compounds are usually mixed on compounding mills or in mixers such as Banburys. The thiocyanic acid-amine salts of this invention can be added at any time during the formation of the batch. They disperse easily and offer no compounding problems. The compositions containing the activators of this invention are vulcanized in the usual way by heating for the times and at the temperature conventionally employed.

Although these thiocyanic acid salts act only slightly as accelerators by themselves, they impart beneficial activating properties when used in conjunction with accelerators in various rubber stocks. To illustrate the effectiveness of these amine salts of thiocyanic acid as accelerator activators in both natural rubber and synthetic rubber recipes, the following examples in which parts are parts by weight are set forth:

Example 1

Rubber compositions containing the following ingredients were prepared:

| | A (Control) | B | C | D | E |
|---|---|---|---|---|---|
| Natural rubber | 100.0 | 100.0 | 100.0 | 100.0 | 100.0 |
| Zinc oxide | 5.0 | 5.0 | 5.0 | 5.0 | 5.0 |
| Stearic acid | 1.5 | 1.5 | 1.5 | 1.5 | 1.5 |
| Ground sulfur | 3.0 | 3.0 | 3.0 | 3.0 | 3.0 |
| 2-Mercaptobenzothiazole | 0.3 | 0.3 | 0.3 | 0.3 | 0.3 |
| Isopropyl ammonium thiocyanate | | 0.1 | 0.3 | | |
| Cyclohexyl ammonium thiocyanate | | | | 0.1 | 0.2 |

These compositions were evaluated in the Mooney vulcanization test which is described in India Rubber World, vol. 117, p. 216, 1947, "Measurement of the scorch and cure rate of vulcanizable mixtures using the Mooney plastometer," by R. E. Shearer, A. E. Juve and J. H. Musch. In this test, a pellet is placed in the Mooney machine at 280° F. Elapsed time in minutes until the Mooney curve passes through its minimum value is taken as $T_s$. This is arbitrarily selected as the time when vulcanization starts. Elapsed time in minutes until the Mooney viscosity reaches a point 30 Mooney viscosity units above the minimum is taken as $T_c$ or end of vulcanization. $T_s - T_c = \Delta T$ or elapsed vulcanization time.

The results obtained were as follows:

| Sample | $T_s$ | $T_c$ | $\Delta T$ |
|---|---|---|---|
| A | 6.5 | 10.2 | 3.7 |
| B | 5.0 | 8.1 | 3.1 |
| C | 4.0 | 6.8 | 2.8 |
| D | 5.0 | 7.6 | 2.6 |
| E | 4.0 | 6.7 | 2.7 |

It will be noted that the compositions containing the amine salts of thiocyanic acid were vulcanized in a lesser time than the control.

Example 2

The following compositions were prepared and tested as in Example 1.

| | F (Control) | G | H |
|---|---|---|---|
| GR-S | 100.0 | 100.0 | 100.0 |
| Carbon black | 50.0 | 50.0 | 50.0 |
| Zinc oxide | 5.0 | 5.0 | 5.0 |
| Light processing oil | 5.0 | 5.0 | 5.0 |
| Stearic acid | 2.5 | 2.5 | 2.5 |
| Sulfur | 2.0 | 2.0 | 2.0 |
| N-cyclohexyl-2-benzo thiazole sulfenamide | 1.2 | 0.8 | 0.8 |
| Isopropyl ammonium thiocyanate | | 0.6 | |
| Cyclohexyl ammonium thiocyanate | | | 0.6 |

| Sample | $T_s$ | $T_c$ | $\Delta T$ |
|---|---|---|---|
| F | 13.5 | 26.5 | 13.0 |
| G | 11.0 | 18.1 | 7.1 |
| H | 13.0 | 21.5 | 8.5 |

The accelerator used in these compositions, N-cyclohexyl-2-benzothiazole sulfenamide, is a standard accelerator which contains a "built-in" activator, the cyclohexyl amine group. However, the data shows that replacing part of the standard accelerator with portions of the activators of this invention resulted in more rapid vulcanization of the rubber composition.

Example 3

The following compositions were prepared:

| | I (Control) | J | K (Control) | L |
|---|---|---|---|---|
| Natural rubber | 100.0 | 100.0 | 100.0 | 100.0 |
| Carbon black | 50.0 | 50.0 | 50.0 | 50.0 |
| Zinc oxide | 3.0 | 3.0 | 3.0 | 3.0 |
| Stearic acid | 2.5 | 2.5 | 2.5 | 2.5 |
| Softener | 1.25 | 1.25 | 1.25 | 1.25 |
| Pine tar | 1.25 | 1.25 | 1.25 | 1.25 |
| Sulfur | 3.0 | 3.0 | 3.0 | 3.0 |
| Benzothiazyl disulfide | 0.5 | 0.3 | | |
| Mixed aliphatic thiazyl disulfide | | | 0.5 | 0.3 |
| Cyclohexyl ammonium thiocyanate | | 0.3 | | 0.3 |

The test described in Example 1 gave the following results:

| Sample | $T_s$ | $T_c$ | $\Delta T$ |
|---|---|---|---|
| I | 6.5 | 10.4 | 3.9 |
| J | 4.5 | 7.7 | 3.2 |
| K | 8.0 | 11.0 | 3.0 |
| L | 4.5 | 7.0 | 2.5 |

These samples were also vulcanized in the usual way and stress-strain tests were run with these results:

| Sample | Cure | 400% Modulus (lbs./sq. in.) | Tensile (lbs./sq. in) | Elongation at Break (percent) |
|---|---|---|---|---|
| I | 40' × 280° F | 1,750 | 2,950 | 526 |
| | 80' × 280° F | 1,875 | 2,750 | 493 |
| J | 40' × 280° F | 1,775 | 2,700 | 493 |
| | 80' × 280° F | 1,800 | 2,825 | 526 |
| K | 40' × 280° F | 1,775 | 3,200 | 559 |
| | 80' × 280° F | 2,325 | 3,000 | 473 |
| L | 40' × 280° F | 1,900 | 3,200 | 546 |
| | 80' × 280° F | 2,650 | 3,250 | 459 |

These data show that physical properties of typical vulcanized rubber compositions are not impaired by substitution of the activators of this invention for portions of the standard accelerator.

Results substantially equivalent to those set forth in the examples are secured when using any of the amine salts of thiocyanic acid herein disclosed as the accelerator activator. For example, the use of n-butyl ammonium thiocyanate, diethyl ammonium thiocyanate, dicyclohexyl ammonium thiocyanate, and other thiocyanic acid salts of alkyl and dialkyl amines gives the same excellent results as described in the examples.

It is to be understood that the term "rubber" is employed herein and in the appended claims in a generic sense to designate rubbery materials which are vulcanizable with sulfur, including caoutchouc, balata, gutta percha, latex, rubber isomers, or synthetic rubber, including rubbery polymers of open-chain conjugated diolefins containing from 4 to 8 carbon atoms, such as butadiene-1,3, isoprene, chloroprene, 2,3-dimethyl butadiene-1,3, as well as rubbery copolymers of such dienes with materials copolymerizable therewith such as acrylonitrile, styrene, methyl acrylate, methyl methacrylate, methacrylonitrile, isobutylene and other copolymerizable monomeric materials, whether or not admixed with pigments, fillers, softeners, peptizers, antioxidants, etc., but not including materials incapable of vulcanization by reaction with sulfur.

Although we have herein disclosed specific embodiments of our invention, we do not intend to limit ourselves solely thereto, but only to the extent indicated in the appended claims.

We claim:

1. The improvement in vulcanization of sulfur-vulcanizable rubber containing sulfur and accelerators which comprises incorporating in the sulfur-vulcanizable rubber composition a small amount of an amine salt of thiocyanic acid, the amine being selected from the class consisting of aliphatic, alicyclic, and aralkyl primary and secondary amines and heterocyclic amines containing a hydrogen atom attached to the hetero-amino nitrogen atom.

2. A process of preparing a sulfur-vulcanized rubber product which comprises mixing a sulfur-vulcanizable rubber composition with sulfur, a thiazole accelerator and an activator comprising an amine salt of thiocyanic acid, the amine being selected from the class consisting of aliphatic, alicyclic, and aralkyl primary and secondary amines and heterocyclic amines containing a hydrogen atom attached to the hetero-amino nitrogen atom, and vulcanizing the composition.

3. The process of claim 2 wherein the activator is an alkyl amine salt of thiocyanic acid.

4. The process of claim 2 wherein the activator is a cycloalkyl amine salt of thiocyanic acid.

5. A product comprising a sulfur-vulcanizable rubber vulcanized in the presence of sulfur, a thiazole accelerator and an activator comprising an amine salt of thiocyanic acid, the amine being selected from the class consisting of aliphatic, alicyclic, and aralkyl primary and secondary amines and heterocyclic amines containing a hydrogen atom attached to the heteroamino nitrogen.

6. A product comprising a sulfur-vulcanizable rubber vulcanized in the presence of sulfur, a thiazole accelerator and an activator comprising isopropyl ammonium thiocyanate.

7. A product comprising a sulfur-vulcanizable rubber vulcanized in the presence of sulfur, a thiazole accelerator and an activator comprising cyclohexyl ammonium thiocyanate.

8. A sulfur-vulcanizable composition comprising a sulfur-vulcanizable rubber, sulfur, a thiazole accelerator and an amine salt of thiocyanic acid, the amine being selected from the class of aliphatic, alicyclic, and aralkyl primary and secondary amines and heterocyclic amines containing a hydrogen atom attached to the amino nitrogen.

9. A sulfur-vulcanizable composition comprising a sulfur-vulcanizable rubber, sulfur, a thiazole accelerator and isopropyl ammonium thiocyanate.

10. A sulfur-vulcanizable composition comprising a sulfur-vulcanizable rubber, sulfur, a thiazole accelerator and cyclohexyl ammonium thiocyanate.

No references cited.